J. H. KOUNS.
LEVEL.
APPLICATION FILED MAR. 25, 1909.
959,759.
Patented May 31, 1910.
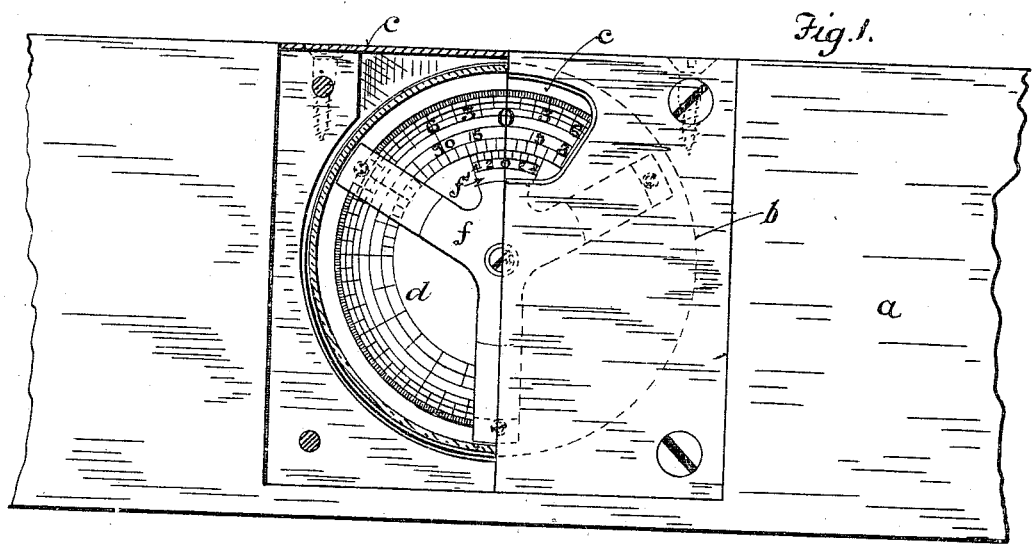
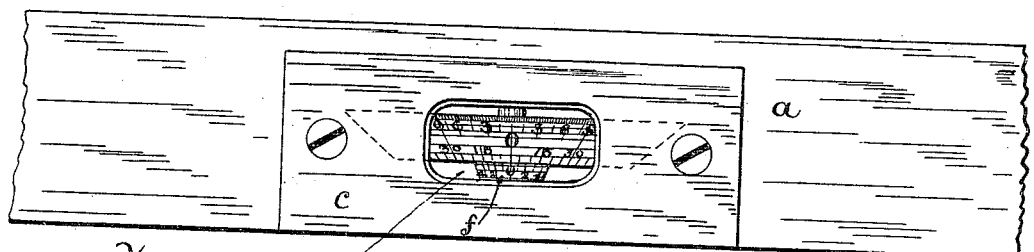
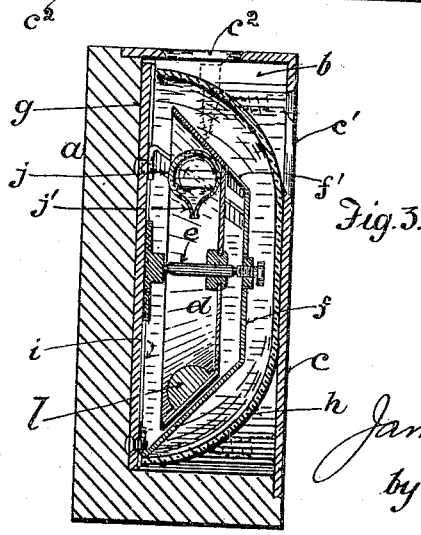
Witnesses:
Inventor:
James H. Kouns
by T. J. Geisler
Atty.

UNITED STATES PATENT OFFICE.

JAMES H. KOUNS, OF EUGENE, OREGON.

LEVEL.

959,759.  Specification of Letters Patent.  Patented May 31, 1910.

Application filed March 25, 1909. Serial No. 485,835.

*To all whom it may concern:*

Be it known that I, JAMES H. KOUNS, a citizen of the United States, and a resident of Eugene, Lane county, Oregon, have invented a new and useful Improvement in Levels, of which the following is a specification.

This invention has for its object to obtain a level comprising a wheel-like indicator oscillating in a vertical plane, said indicator being provided with peripheral graduations to indicate the degree of inclination of the surface on which it is set, and to combine therewith means whereby the indicator will be automatically righted, that is to say, maintained in true perpendicular position with respect to its graduations; and means whereby the indicator is rapidly brought to a state of rest after having been moved, so as to facilitate the rapid readings of the instrument.

In carrying my invention into practice, I have found it to my purpose to inclose the oscillating indicator of my level entirely in a liquid, as a means for speedily bringing the indicator to a state of rest; and in order to accommodate any undue expansion and contraction of the liquid, due to rise in temperature, and thus avoid any undue stress or variation of the pressure of the liquid upon my oscillating indicator, I provide an air-bubble in the liquid, which air-bubble, however, is held captive, so as to utilize the buoyancy thereof to right the wheel, and incidentally to prevent the bubble from lodging over the graduated margin of the wheel, and thus interfering with the reading thereof.

The arrangement of my level and its parts is illustrated in the drawings, in which:

Figure 1 is a partial elevation of a level, provided with my improvements; Fig. 2 is a top view, corresponding with Fig. 1; and Fig. 3 is a transverse section, approximately centrally taken through the operating parts of my level.

The letters designate the parts described.

The stock or beam, $a$, is made with a suitable aperture $b$, in which to contain the operating parts of my device. The front and top of the apertured part of the beam has affixed thereto a plate $c$, provided with apertures $c'$, $c^2$, through which to read the peripheral, marginal graduations of the oscillating wheel or indicator $d$. The latter is rotatably mounted on a spindle $e$, journaled in a frame $f$, secured to a back plate $g$. The frame $f$, as shown in the elevation thereof in Fig. 1, may be made of spider form, and in its upper part has a member $f'$, provided with vernier graduations. The rim of the oscillating indicator, $d$, is preferably made of bevel form, so as to facilitate the reading thereof through either of the apertures $c'$, $c^2$ of the plate $c$, that is, from the top or the side, as convenient; and said beveled rim is provided with suitable graduations, as shown. The frame $f$, and the oscillating indicator $d$ are inclosed in a glass case $h$, which is filled with a suitable liquid.

A convenient way of assembling the parts and filling the glass case $h$ with liquid is to arrange the case $h$ cup-like on the plate $c$, then fill the case with liquid, then place the plate $g$ in position, interposing a gasket $i$ between the parts, to render them liquid-tight, and finally fastening the plate $c$ in position to the beam $a$. Of course, the exact details of construction of my level are not material to the purpose of my invention.

At the upper end of the oscillating indicator $d$ I affix a glass bubble $j$, filled with air and provided with a narrow apertured neck $j'$. One or more of these bubbles may be used as deemed expedient. The purpose thereof is to right the oscillating indicator $d$ by the buoyancy of air confined in the bubble $j$, and incidentally to accommodate the expansion and contraction of the liquid within the case $h$. When only a single bubble $j$ is used, the same should be affixed in a line with the graduation indicating the vertical when the indicator is in equilibrium, and if more than one bubble, like $j$, be introduced in the oscillating indicator $d$, the same should be arranged in conformity to the same principle. The idea is, as is evident, to maintain the oscillating indicator $d$ in proper vertical position with respect to its marginal graduations. To accomplish this end, I also find it convenient to supplement the buoyant force of the bubble, $j$, by a weight $l$, so that gravity may assist buoyancy. The neck $j'$ is contracted, so as to confine the air within the bubble $j$, at the same time allowing the liquid to flow therethrough into the bubble $j$ to compress the air confined therein, when there is undue pressure caused in the liquid confined in the glass case $h$, due to rise in temperature.

I claim:

1. In a level, the combination comprising a beam having an aperture, a transparent containing case in said aperture, said case being filled with a liquid, an indicator oscillating in said case in a vertical plane, said indicator being provided with peripheral graduations, and a globular hollow body constituting an air-chamber affixed to the upper part of said indicator in line with the vertical radius thereof when in equilibrium, said globular body being provided with an aperture opening into the liquid filling the case, for the purpose specified.

2. In a level, the combination comprising a beam having an aperture, a transparent containing case in said aperture, said case being filled with a liquid, an indicator oscillating in said case in a vertical plane, said indicator being provided with peripheral graduations, and a globular hollow body constituting an air-chamber affixed to the upper part of said indicator in line with the vertical radius thereof when in equilibrium, said globular body being provided with a narrow apertured neck opening into the liquid filling the case, for the purpose specified.

3. In a level, the combination comprising a beam having an aperture, a transparent containing case in said aperture, said case being filled with a liquid, an indicator oscillating in said case in a vertical plane, said indicator being provided with peripheral graduations, and a globular hollow body constituting an air-chamber affixed to the upper part of said indicator in line with the vertical radius thereof when in equilibrium, said globular body being provided with an aperture opening into the liquid filling the case, for the purpose specified, and the lower part of the indicator being weighted to right the same.

4. In a level, the combination comprising a beam having an aperture, a transparent containing case in said aperture, said case being filled with a liquid, a wheel-like indicator pivoted in the case and oscillating in a vertical plane, said indicator being provided with peripheral graduations, and a globular hollow body constituting an air chamber affixed to the upper part of said indicator in line with the vertical radius thereof when in equilibrium, said globular body being provided with an aperture opening into the liquid filling the case, for the purpose specified.

5. In a level, the combination comprising a beam having an aperture, a transparent containing case in said aperture, said case being filled with a liquid, a wheel-like indicator pivoted in the case and oscillating in a vertical plane, said indicator being provided with peripheral graduations, and a globular hollow body constituting an air chamber affixed to the upper part of said indicator in line with the vertical radius thereof when in equilibrium, said globular body being provided with an aperture opening into the liquid filling the case, for the purpose specified, and the lower part of the indicator being weighted to right the same.

6. In a level, the combination comprising a beam having an aperture, a transparent containing case in said aperture, said case being filled with a liquid, a wheel-like indicator pivoted in the case and oscillating in a vertical plane, said indicator being provided with a beveled rim having peripheral graduations, a vernier arranged relative to said graduations, and a globular hollow body constituting an air chamber affixed to the upper part of said indicator in line with the vertical radius thereof when in equilibrium, said globular body being provided with an aperture opening into the liquid filling the case, for the purpose specified.

7. In a level, the combination comprising a beam having an aperture, a transparent containing case in said aperture, said case being filled with a liquid, a wheel-like indicator pivoted in the case and oscillating in a vertical plane, said indicator being provided with a beveled rim having peripheral graduations, a vernier arranged relative to said graduations, and a globular hollow body constituting an air chamber affixed to the upper part of said indicator in line with the vertical radius thereof when in equilibrium, said globular body being provided with an aperture opening into the liquid filling the case, for the purpose specified, and the lower part of the indicator being weighted to right the same.

8. In a level, the combination comprising a beam having an aperture, a transparent containing case in said aperture, said case being filled with a liquid, a wheel-like indicator pivoted in the case and oscillating in a vertical plane, said indicator being provided with a beveled rim having peripheral graduations, a vernier arranged relative to said graduations, and a globular hollow body constituting an air chamber affixed to the upper part of said indicator in line with the vertical radius thereof when in equilibrium, said globular body being provided with a narrow apertured neck opening into the liquid filling the case, for the purpose specified, and the lower part of the indicator being weighted to right the same.

JAMES H. KOUNS.

Witnesses:
J. J. WALTON,
S. P. NESS.